United States Patent
Ruutu et al.

(10) Patent No.: US 6,327,474 B1
(45) Date of Patent: *Dec. 4, 2001

(54) METHOD FOR LOCATING MOBILE STATION IN DISTRIBUTED MANNER

(75) Inventors: Ville Ruutu; Timo Rantalainen, both of Helsinki; Marko Alanen, Tampere; Olli Hyvärinen, Tampere; Gudni Gunnarsson, Tampere; Matti Vilppula, Pirkkala; Maiana Savu, Tampere, all of (FI)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/188,507

(22) Filed: Nov. 9, 1998

(30) Foreign Application Priority Data

Nov. 11, 1997 (FI) .......................................... 974196

(51) Int. Cl.⁷ .................................................. H04Q 7/20
(52) U.S. Cl. .......................... 455/456; 455/422; 342/357; 342/450
(58) Field of Search .................................. 455/456, 457, 455/404, 422, 517, 524, 525; 342/357, 450

(56) References Cited

U.S. PATENT DOCUMENTS

| | | | | |
|---|---|---|---|---|
| 4,748,685 | * | 5/1988 | Rozanski, Jr. ............ | 455/404 |
| 5,542,100 | * | 7/1996 | Hatakeyama ............ | 455/404 |
| 5,583,870 | * | 12/1996 | Delprat et al. ............ | 370/337 |
| 5,675,344 | | 10/1997 | Tong et al. ............ | 342/457 |
| 5,799,255 | | 8/1998 | Berg et al. ............ | 455/551 |
| 5,815,538 | * | 9/1998 | Grell et al. ............ | 455/456 |
| 5,883,598 | * | 3/1999 | Parl et al. ............ | 455/456 |
| 5,926,765 | * | 7/1999 | Sasaki ............ | 455/456 |
| 5,946,626 | * | 8/1999 | Foladare et al. ............ | 455/456 |
| 5,960,355 | * | 9/1999 | Ekman et al. ............ | 455/456 |
| 5,970,413 | * | 10/1999 | Gilhousen ............ | 455/456 |
| 5,983,109 | * | 11/1999 | Montoya ............ | 455/456 |
| 5,987,329 | * | 11/1999 | Yost et al. ............ | 455/456 |

FOREIGN PATENT DOCUMENTS

| | | |
|---|---|---|
| 44 09 178 A1 | 9/1995 | (DE) . |
| 78567 | 4/1989 | (FI) . |
| 963833 | 9/1996 | (FI) . |
| 101445 B | 4/1997 | (FI) . |
| 964869 | 10/1997 | (FI) . |
| WO 92/13284 | 8/1992 | (WO) . |
| WO 95/14936 | 6/1995 | (WO) . |
| WO 97/11384 | 3/1997 | (WO) . |

OTHER PUBLICATIONS

Finnish Search Report.

* cited by examiner

*Primary Examiner*—Lee Nguyen
*Assistant Examiner*—Simon Nguyen
(74) *Attorney, Agent, or Firm*—Perman & Green, LLP

(57) ABSTRACT

The invention relates to a method for locating a mobile station (1) by means of the mobile station (1) and a location service center (LSC) (5) in the mobile network by dynamically distributing the computing between these two. Preferably the mobile station (1) measures impulse responses of received bursts to determine time differences, and preprocesses measurement results. The location service center (5) performs the final processing. According to the invention, dummy bursts are also used in the locating process. The method also includes an automatic locating procedure activated in conjunction with an emergency call.

19 Claims, 5 Drawing Sheets

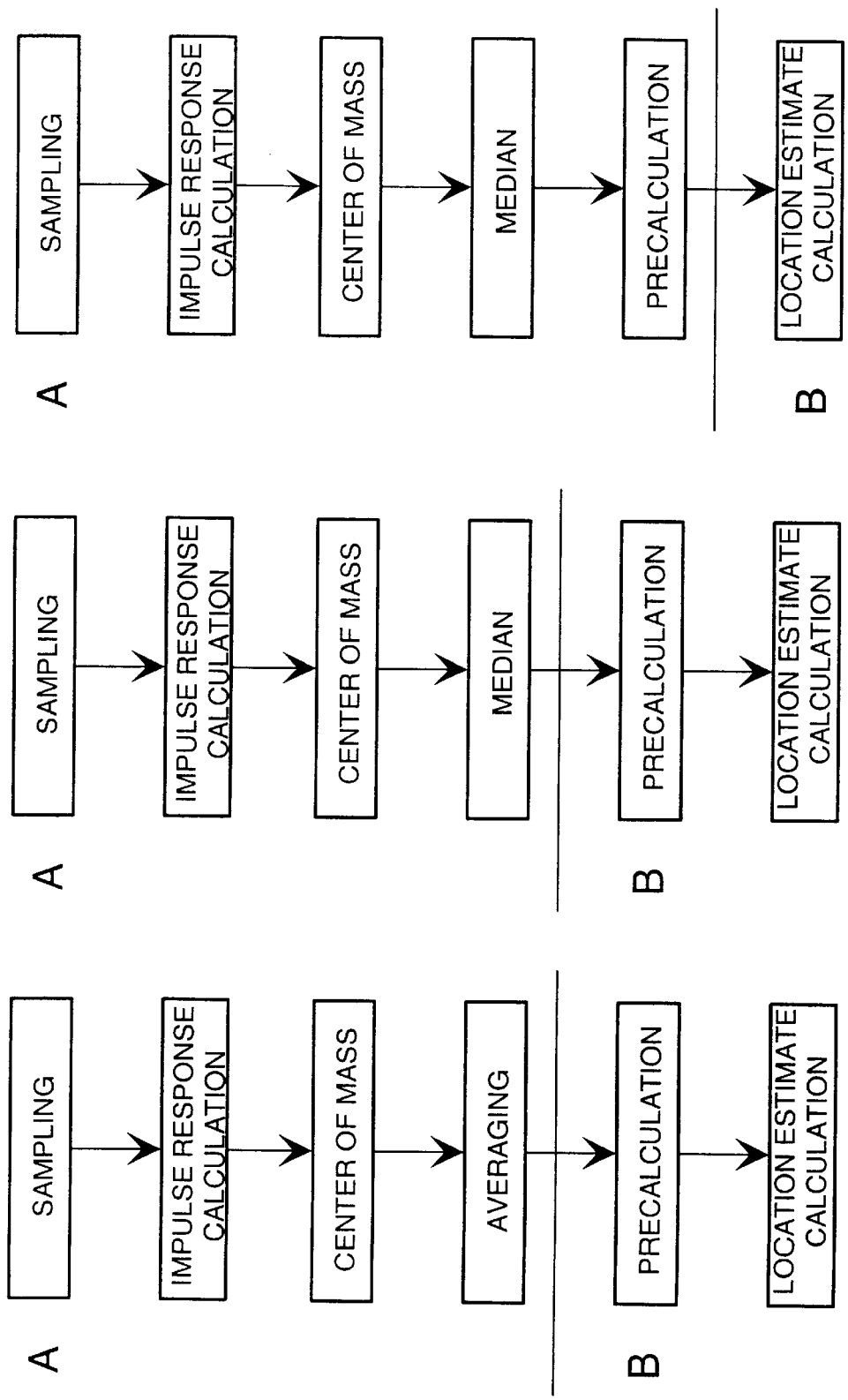

METHOD FOR LOCATING MOBILE STATION IN DISTRIBUTED MANNER

BACKGROUND OF THE INVENTION

The invention relates to a method defined in the preamble of claim 1 for locating a mobile station (MS) in a distributed manner.

Locating methods are known which are based on the transfer of radio signals between a mobile station and mobile network. The location is determined on the basis of signals transmitted from a mobile station or from base stations and on the measurement of those signals as well as on processing the results in a substantially centralized manner.

One such method is a locating method used in the GSM system, based on the propagation time of a radio transmission and utilizing the time difference of arrival (TDOA), wherein a mobile station transmits a signal to at least three base transceiver stations (BTS) which measure the arrival times of the signals so that their time differences can be calculated. The time differences are obtained using the impulse response which is a result of correlation between a known bit pattern and a received burst signal. The bit pattern is a so-called training sequence or a corresponding known sequence. The time difference can be determined on the basis of the impulse response e.g. by selecting the point corresponding to the highest correlation or the point corresponding to the first arrived component. First arrived component refers to the signal that arrived via the shortest route in multipath propagation and the impulse response peak caused by the signal at the point corresponding to the signal. The time differences are used in a location service center (LSC) to produce at least two hyperbolas the intersection of which indicates the position of the mobile station. Because of inaccuracies in the time differences the intersection of the hyperbolas define an area, not a singular point. Positions of the hyperbolas are determined with respect to the positions of the base stations.

In a second such method a mobile station receives signals from base stations. The location is calculated in the mobile station or the measurement data, i.e. observed time difference (OTD), are sent to the mobile network where the location is then calculated.

People belonging to special groups needing emergency services, say, those suffering from heart troubles or epilepsy, nowadays have alarm devices with which they can call for immediate help. These alarm devices require special arrangements and indicate the location of the person needing help and the need for help to an emergency center. In one particular case, these devices are signalling apparatus connected to the public telephone network at the patient's home, preferably beside the bed and in the living room but also elsewhere, e.g. in the garden. As a switch in such a device is pressed, the device transmits an alarm message via the public telephone network to an emergency center. The location of the device is known in the emergency center.

A problem with the known methods is the need for signalling capacity between base stations and the location service center and the mobile station. Another problem is the computing capacity of the processor in the mobile station when the location is calculated by the mobile station. A further problem related to the indication of an emergency is brought about by the necessary special arrangements and the fact that the person using them has to keep in the vicinity of them and, when calling to an emergency center by means of a mobile station, by the fact that the caller has to know his exact location and has to communicate it verbally.

Furthermore, a problem with the known mobile-based positioning methods is that the mobile station carries out constant measurements without taking into account the surroundings and other such parameters.

SUMMARY OF THE INVENTION

An object of the invention is to eliminate the aforementioned disadvantages of the prior art.

The method according to the invention is characterized by what is expressed in claim 1. Preferred embodiments of the invention are described in the subclaims.

The invention concerns a method for determining the location of a mobile station by means of radio signals between the mobile station and mobile network. In accordance with the invention, location computing is distributed between a mobile network element and the mobile station in such a manner that location computing is divided into operation sequences, and those operation sequences are carried out in the mobile network element and in the mobile station. In the mobile network, computing is preferably performed by a location service center. The distributed units exchange information via the mobile network and air interface.

In an application of the method, the first operation sequences are carried out in the mobile station. Base stations send to the mobile station a positioning signal which may be a normal base station signal or a special signal optimized for positioning, preferably controlled from a location service center. At least the arrival of the signal is measured in the mobile station. Alternatively, a preliminary analysis is carried out on the measurement data in the manner according to distributed positioning. The type of analysis is chosen according to the locating method and used to determine the information necessary for the method. For example, in the OTD method, correlation between a signal received from a neighboring base station and a bit pattern in a known signal is used to produce an impulse response the shape of which is checked. As the mobile station has adjusted its timing to be in accordance with the signals of the serving base station, the impulse response is used to determine an observed time difference (OTD) between the serving base station and the neighbour base station, preferably by finding the center of mass or the first rising edge of the impulse response. If necessary, the location service center sends to the mobile station additional data needed in the analysis. Those additional data are e.g. data based on the serving cell of the cellular mobile network, such as correction co-efficients or other environmental parameters. For example, in the OTD method, additional data may indicate parameters related to the shape of the impulse response expected in that particular environment. The relative height of the highest peak in the impulse response with respect to the surrounding lower peaks should preferably exceed a certain threshold level, otherwise it is found that the shape of the impulse response is wrong and the measurement has failed.

In an application of the method the first operation sequences for positioning are selected from among a set of operation sequences on the basis of a command from the mobile network. Such a command is issued on the basis of environmental or measurement data, for example. Environmental data can be obtained on the basis of the cell identity, for example. Measurement data comprise at least data on signals received at the mobile station or at base stations. The command is determined in the mobile network preferably by a location service center LSC. In practice, when using the OTD method, for example, a mobile network may find that the mobile station is located in a mountainous area where there is high probability of delayed components, such as reflections from mountain sides, arriving after the signal component that arrives via the direct route. In such a case, intensity in the impulse response is systematically shifted later and, therefore, choosing the first rising edge is a better alternative than the center of mass. So, the mobile network can drive the mobile station to carry out the impulse response analysis with the first rising edge, i.e. to select, for instance, the first impulse response tap the height of which exceeds 40% of the height of the highest tap. In the mobile network it is advantageously calculated the dispersion of the OTD values reported by the mobile station, and if the dispersion is too high, it is deduced that it is impossible in the mobile station to determine the correct OTD value by means of the impulse response and the mobile station is instructed to average several impulse responses. This is done e.g. when the mobile station is within the area of a cell located in a mountainous area. In the case according to the example, reflections will be generated and therefore the use of the center of mass of the impulse response would probably lead to an erroneous time difference measurement result.

In an application of the method the first operation sequences of positioning performed in the mobile station are adapted to the measurement results by determining parameters. The decision on the adaptation is made in the mobile station or in the mobile network. Measurement results relevant from the adaptation standpoint include signal strength, noise ratio etc. The parameters to determine are preferably coefficients of an arithmetic formula, but possibly also Boolean operators used for the selection of arithmetic routines or correction measures. For example, in the OTD method the weakness and poor signal-to-noise ratio of the received signal indicate that the measurement is unreliable or inaccurate. Then, calculation of the center of mass in the impulse response is a more reliable alternative than determining the first rising edge. The location service center may also control the mobile station according to the environment and the characteristics of the mobile network cell in such a manner that positioning in those surroundings is as accurate as possible.

In an application of the method, data processed in the mobile station by the first operation sequences are transferred to a location service center.

In an application of the method, impulse responses are calculated for the received location signals in the mobile station and those impulse responses are transferred to a location service center for further processing. The impulse responses may also be processed in the mobile station to determine the arrival time differences. This way, only a small amount of data needs to be transferred between the mobile station and the service center in the locating process.

In an application of the method, raw measurement data are transferred from the mobile station to a location service center. This way, a lot of data needs to be transferred between the mobile station and the service center in the locating process, but the processor capacity needed in the mobile station is low.

In an application of the method, the final stage of the locating process is computed in a location service center in the mobile network. The service center receives the processed or raw measured results from the mobile station and calculates the location estimates based on them. If necessary, the mobile station measures several series of measurement results. When using several different series of measurement results, a more accurate location estimate is calculated using averaging, for example. If additional data are sent from the mobile station in addition to the primary measured data, those data will be available in the locating process. The locating method and possible parameters for it are selected on the basis of the additional data.

In an application of the method, the distribution of the locating process between a mobile network and mobile station is dynamically altered by moving the execution boundary of the operation sequences. The execution boundary means a boundary between operation sequences which divides the overall computing into components carried out in the mobile network and in the mobile station. Computing is distributed according to the situation or the mobile station's computing capacity. Moving the execution boundary is controlled e.g. by taking into account the operating environment, characteristics of the measurement results, mobile station's computing capacity and the signalling capacity available. For example in the OTD system the impulse response analysis can be performed in the mobile station or in the mobile network according to the environment. In a mountainous area, indirect signals caused by strong reflections make the analysis more complicated so that a decision is made in the mobile station or in the mobile network to send the impulse response from the first to the latter to be analyzed. The mobile station e.g. finds that the shape of the impulse response is exceptional or the computing capacity is insufficient and therefore it is decided to have the analysis done by the network. When there is not enough signalling capacity between the mobile stations and the mobile network, it is preferably expressed by the latter to the mobile stations the need to analyze as much data as possible so that the amount of information to be transferred be as small as possible.

In one solution the mobile station decides what to report to the location service center. The data transferred comprise the analyzed or only measured results as well as additional data such as noise ratios, signal strengths and impulse responses. Alternatively, the location service center requests certain measurement results from the mobile station. When placing a lot of the computation load on the mobile station only a little amount of transfer capacity is needed for the transfer of results because the processed measurement results contain only key information about the location. Raw measurement results, on the other hand, contain all measurable data and thus require a lot of capacity in the transfer.

Let us consider OTD positioning as an example. In that system the mobile station normally calculates the impulse response, determines the time differences of the signals received from different base stations, and sends the time difference values to the service center. If the shape of the impulse response is such that the mobile station cannot determine the time difference, all the impulse response data are sent to the service center. If the signalling capacity is low, e.g. because of network congestion, the mobile station is instructed to carry out a more accurate impulse response analysis. If in some situation the computing capacity of the mobile station is too low for the mobile station to perform the task assigned to it, all the measured signals or some of the signals will be sent from the mobile station to the mobile network to be analyzed. When it is known that the mobile station is located in a spot difficult to position, say, in the mountains, the mobile station is preferably immediately instructed to report the measured signals to the service center as the mobile station is not likely to have sufficient capacity for the impulse response analysis on the spot.

In an application of the method, dummy bursts are used for timing. Dummy bursts are transmitted when there is no information to transmit, which often occurs when a base station is not heavily loaded. The dummy burst in GSM comprises 142 fixed bits and is different from any other known training sequence in the system. There are receivable bursts primarily on the common control channel (CCCH), broadcast control channel (BCCH), frequency control channel (FCCH), fast associated control channel (FACCH), slow associated control channel (SACCH), stand-alone dedicated control channel (SDCCH) as well as on the synchronization channel (SCH) and traffic channel (TCH). The synchronization channel contains bursts that have long training sequence codes (TSC) and thus are suitable for timing measurements. Bursts on the control channels and on the traffic channel are not as long as those on the synchronization channel and thus are not as suitable for timing measurements but are, however, sufficient.

Let us consider by way of example a locating process according to the invention using the method involving the time difference observed in the signal reception. The locating process is initiated by the user of the mobile station or by the mobile network which requests it or conveys such a request from elsewhere. For example, automatic location is started on the basis of an emergency call. The mobile station receives burst signals the observed time difference of which is calculated using the impulse response. The mobile station carries out the preliminary operations related to the locating process and sends the processed results to a location service center in the mobile network. The location service center calculates on the basis of the received processed time difference data and base station location data the location of the mobile station. The location information is then sent to the appropriate recipients.

In an application of the method the locating process is started automatically when a call is made to an emergency number. The number may belong to an emergency center, police, fire brigade or the coast guard, for example.

In an application of the method the location is computed and automatically transmitted to an emergency center as a result of the activation of the emergency function. The emergency function is preferably activated in a menu-based manner or by means of a special key reserved for that function on the mobile station.

In an application of the method the mobile network waits for a regularly repeated message from the mobile station, and if the message is missing the mobile network generates an alarm. The message preferably contains information about the location of the mobile station. The most recent location of the mobile station can be determined on the basis of the last received information after the message transmissions have ceased.

In an application of the method the mobile station determines when the alarm conditions are fulfilled. This is performed by means of separate measuring instruments connected to the mobile station or using the mobile station's internal measuring functions.

In an application of the method different burst training sequences are compared with the received signal for the computing of time differences, and the impulse response obtained as a result of the correlation is used for deciding whether the training sequence is correct. Conditions can be set concerning the shape of the impulse response on the basis of which the training sequence is recognized correct. A condition is e.g. the clarity of the impulse response maximum compared to other moments of time.

In an application of the method the mobile station carries out measurements and precalculation in order to decide whether or not measurement results will be transmitted from the mobile station to a location service center. In the OTD positioning system, for example, the mobile station performs measurements and calculates observed time differences. If the time differences have changed more than a threshold value it is deduced that the location of the mobile station has changed. For this, the mobile station does not need information about the real location of the mobile station. The change of location is reported to a location service center. Measurement results or processed data are compared with known reference values and further operation is based on the result of the comparison.

In an application of the method the mobile station carries out measurements and precalculation without performing the locating process proper in order to decide whether functions should be activated in the mobile station.

In an application of the method the mobile station carries out measurements and precalculation and compares the results with reference values in order to find out without performing the locating process proper whether the mobile station is located in a certain predetermined area. The comparison with reference values is carried out in order to determine whether the mobile station is located in an area for which certain call prices have been set together with a network operator. The call prices in such an area are usually lower than elsewhere, but higher in difficult terrain where it is expensive to create mobile communication connections. The reference values consist of data stored in the mobile station's memory, such as information about the location of the user's home, for instance. The reference values may also be continuously available in the mobile network. For example, in the OTD method the OTD values between different base stations in a certain area, say, in the user's home area, are preferably determined by measuring. These measured values are used as reference. When a decision is made by the mobile station or by the user or based on the mobile network's criteria to check whether the mobile station is located in a certain area, the mobile station measures the OTD values. The measurement results are compared with the stored reference values to verify sufficient correlation and thus to determine the location area. An advantageous criterion is that five measured OTD values out of eight possible are congruent with each other at the accuracy of at least 200 m. When using OTD values, these can be determined also when the mobile station is idle. Preferably the process is carried out at certain intervals or in conjunction with a handover. Thus it is possible to indicate on the mobile station to the user, before he makes a call, that the mobile station is located in a special area, such as home area, and the tariff applied. When using the OTD method in a non-synchronized mobile network, also the time differences between the base stations have to be transmitted to the mobile station so that it can measure the OTD values. The timing differences are transmitted using the known cell broadcast method or on the broadcast control channel (BCCH). If the measurement results correlate with the reference values the mobile station deduces that it is located in an area according to the reference values, advantageously at home. The observed location is indicated to the user so that he might know that the tariff according to that location is applied. When the user places a call, the mobile station informs the mobile network that it is located in a special tariff area or transmits the measurement results to the mobile network so that by analyzing them the mobile network can deduce the same.

An advantage of the invention is that by flexibly distributing the location computing the system capacity is more efficiently used. Signalling or computing is weighted in such a manner that computing is distributed a lot and more information is transferred, or computing is done in a more centralized fashion and less information is transferred. The mobile station does not process all the data, so it does not require a lot of processor power. However, preliminary processing in the mobile station significantly reduces the amount of information transferred. Instead of all measurement results, only the key data are transferred. So, by means of the invention, computing can be done where the computing capacity is sufficient, but without unnecessarily consuming the signalling capacity. This way, the locating accuracy will not be affected because of insufficient computing capacity of the mobile station in difficult circumstances.

Another advantage of the invention is that at the beginning of an emergency call the locating process is carried out automatically and swiftly.

A further advantage of the invention is that when using dummy bursts for locating, the timing of the received signal is measured considerably more often than when using only control channel or traffic channel bursts, so that there are more measurement results and they can be filtered e.g. by averaging and the measurement will be more accurate.

Another advantage of the invention is that when a mobile station is being located, the mobile station needs to send measurement results only when its position has changed after the previous report.

A further advantage of the invention is that a mobile station can indicate to the user in idle state whether it is in a special area, such as home, where the call tariff is lower. This way, the user has knowledge of the call tariff already before making a call.

BRIEF DESCRIPTION OF THE DRAWING

The invention will now be described in more detail with reference to the accompanying drawing wherein FIG. 6 shows by way of example the distribution of locating functions.

DETAILED DESCRIPTION OF THE INVENTION

Figure 1:
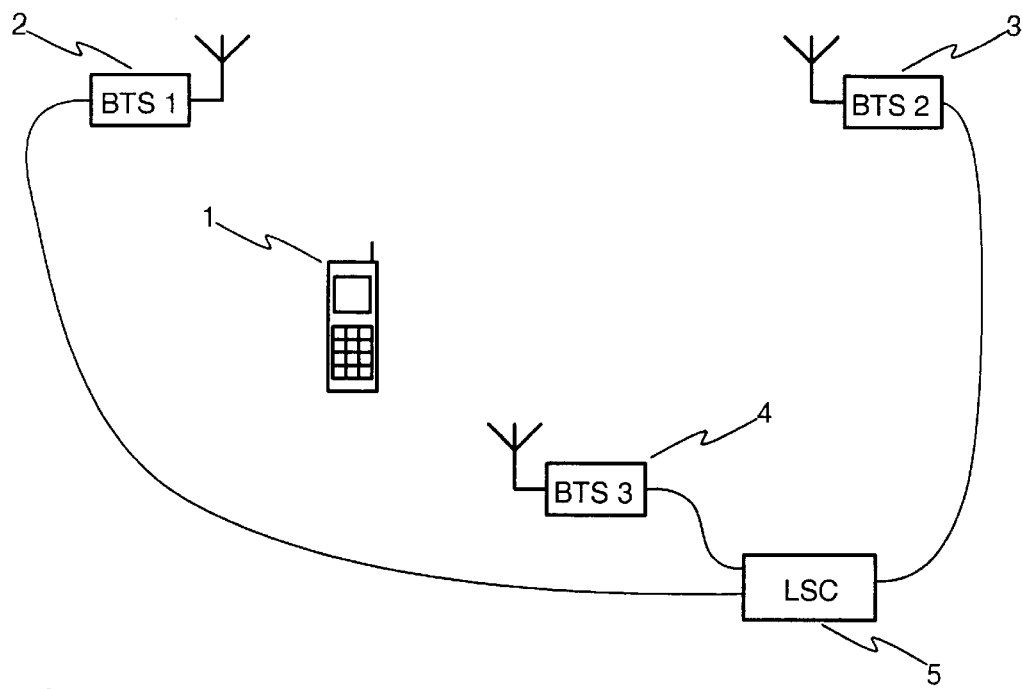
FIG. 1 shows essential components in the arrangement according to the invention.

FIG. 1 shows essential components of the arrangement according to the invention. A mobile station 1 is located in the coverage area of base transceiver stations 2, 3, 4. The base transceiver stations 2, 3, 4 are connected with a location service center 5 in which at least part of the computing is carried out in accordance with the invention.

Figure 2:
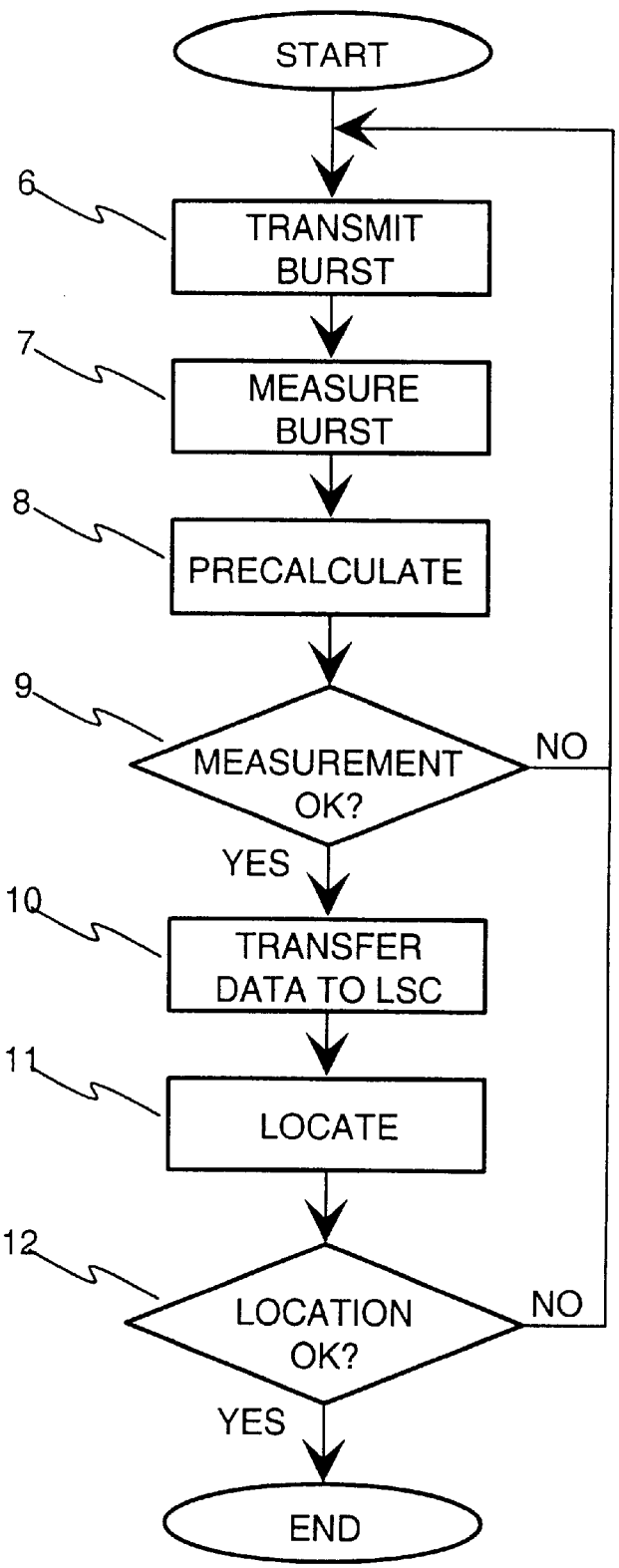
FIG. 2 shows in the form of flow diagram the essential stages of the operation of a locating method according to the invention.

FIG. 2 shows in a flow diagram essential stages of the operation of a locating method according to the invention. In the first step 6, signals containing bursts are transmitted in a known manner from the base transceiver stations. In a mobile station impulse responses are measured 7 from the burst signals using time differences compared to a reference. The reference is preferably created from a burst signal transmitted by another base transceiver station. Precalculation 8 is carried out for the time differences and other data, such as signal strengths, comprising data analyzation and possibly processing for the next locating steps. For instance, in the OTD method precalculation may include the checking of the shape of the impulse response and the search for the center of mass corresponding to the time difference. This processing yields e.g. the numeral time differences of the burst signals instead of just the received signal samples. If the precalculation was successful 9, the information processed in the precalculation is transferred 10 by radio and through the mobile network to a location service center in which the final calculation steps are carried out 11, otherwise the process returns to the start. These calculation steps include e.g. locating on the basis of numeral time differences and base station location data. If locating was successful 12, the process ends, otherwise it returns to the start.

Figure 3:
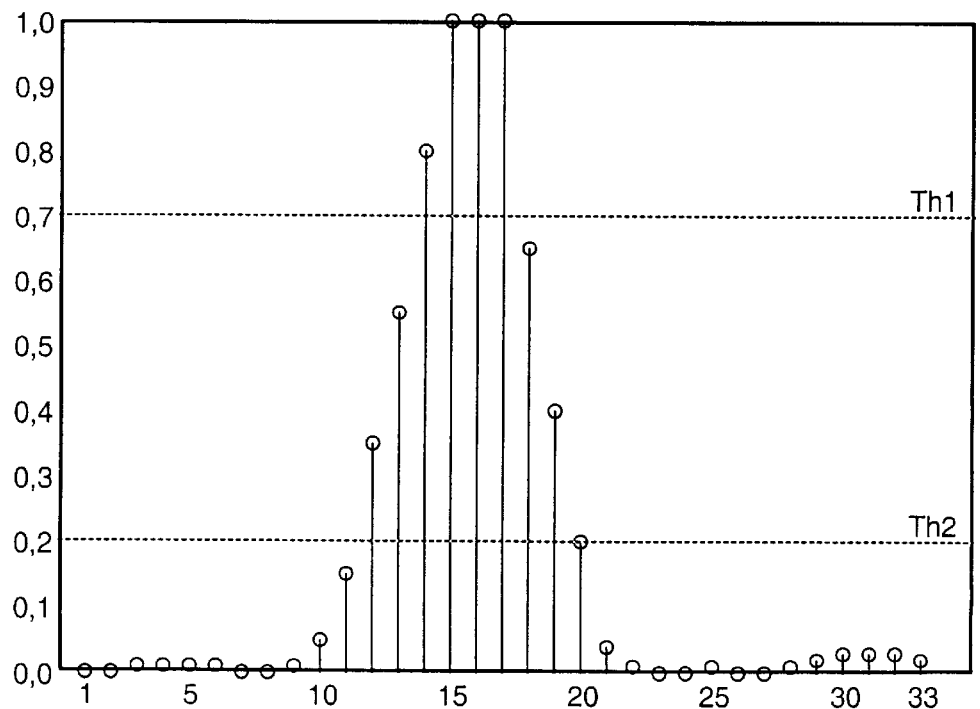
FIG. 3 shows an impulse response in a coordinate system.

FIG. 3 shows an impulse response in a coordinate system. The horizontal axis represents time and the vertical axis represents normalized correlation. Response taps 1 to 9 and 22 to 33 show almost negligible correlation with the training sequence code used. Response taps 10 to 21 show detectable correlation between the burst and the training sequence code. Response taps 15 to 17 show full or almost full correlation. Thus the time difference corresponds to response taps 15 to 17. By combining this with the information about the signal sampling moment one can determine the real magnitude of the time difference in time units, such as sampling intervals or bit sequence lengths. Dashed line Th1 in the coordinate system represents a threshold level which the highest response tap must exceed in order to be acceptable. A second dashed line Th2 in the coordinate system represents a threshold level which the surrounding response taps must not reach for the highest response tap to be acceptable.

Figure 4:
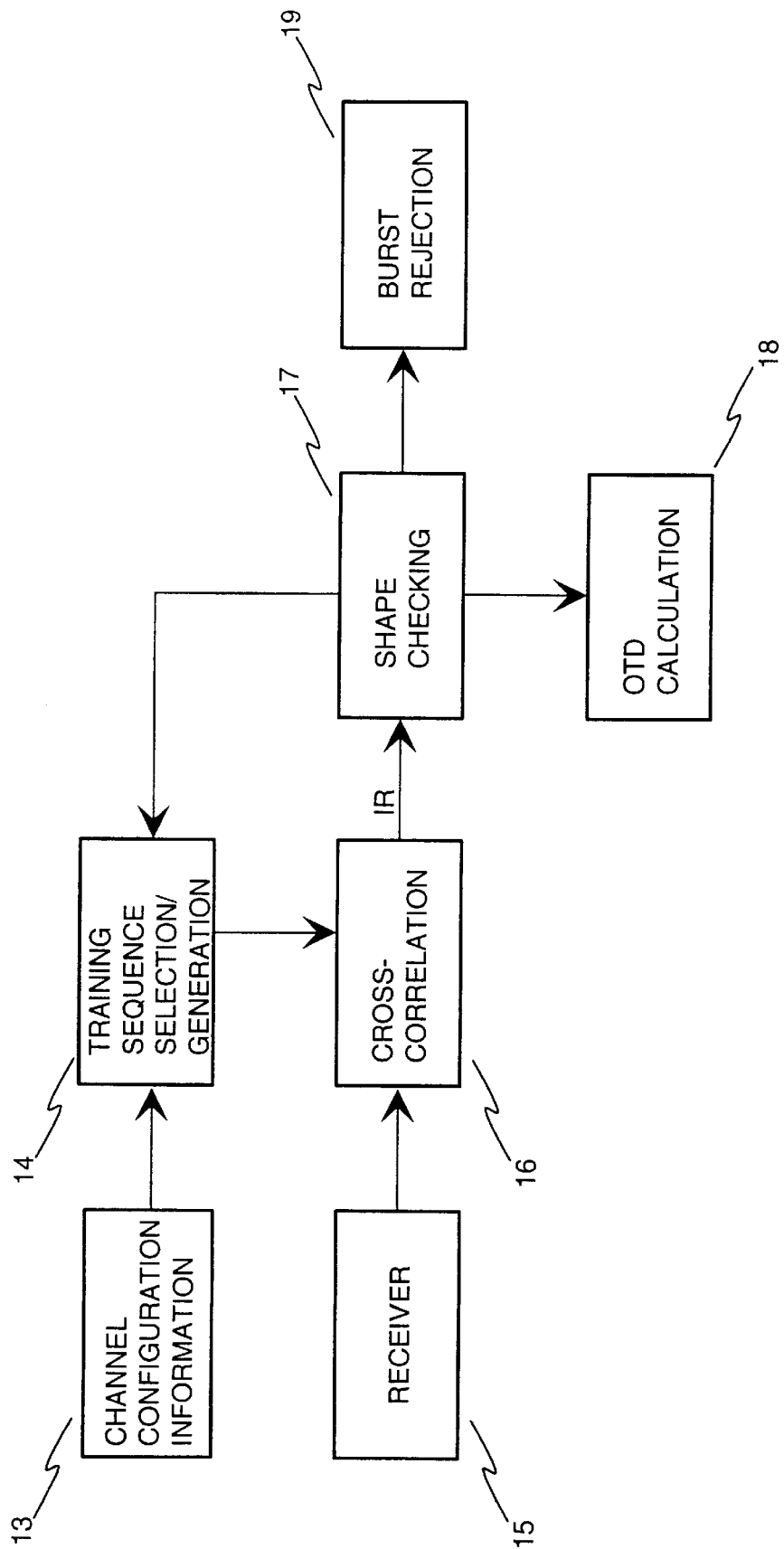
FIG. 4 shows in a block diagram a method for determining a time difference from a received burst, FIG. 5 schematically shows possible boundaries of the distribution of locating functions.

FIG. 4 shows in a block diagram a method for determining the time difference from a received burst. This method is used for calculating time differences between burst signals preferably in a mobile station. Block 13 represents information about the radio channel configuration; it is used for choosing or creating 14 a training sequence. The training sequence is in this case preferably a known training sequence or a bit pattern in a dummy burst. A receiver 15 converts the burst in the radio signal into digital form and sends it further to a cross-correlation block 16 where the burst is compared with the training sequence. The impulse response (IR) obtained is taken to block 17 where the shape of the impulse response is checked. If the shape of the impulse response is acceptable, the method begins to calculate the time difference 18 on the basis of the impulse response, e.g. using the highest response tap or the tap corresponding to the first received signal component. If the impulse response is unacceptable, a different training sequence is selected 14 and the cross-correlation 16 and the checking 17 of the shape of the impulse response are repeated. If all training sequences and the dummy burst have been used in the cross-correlation 16 and the shape is unacceptable, the burst is rejected 19.

Figure 5:
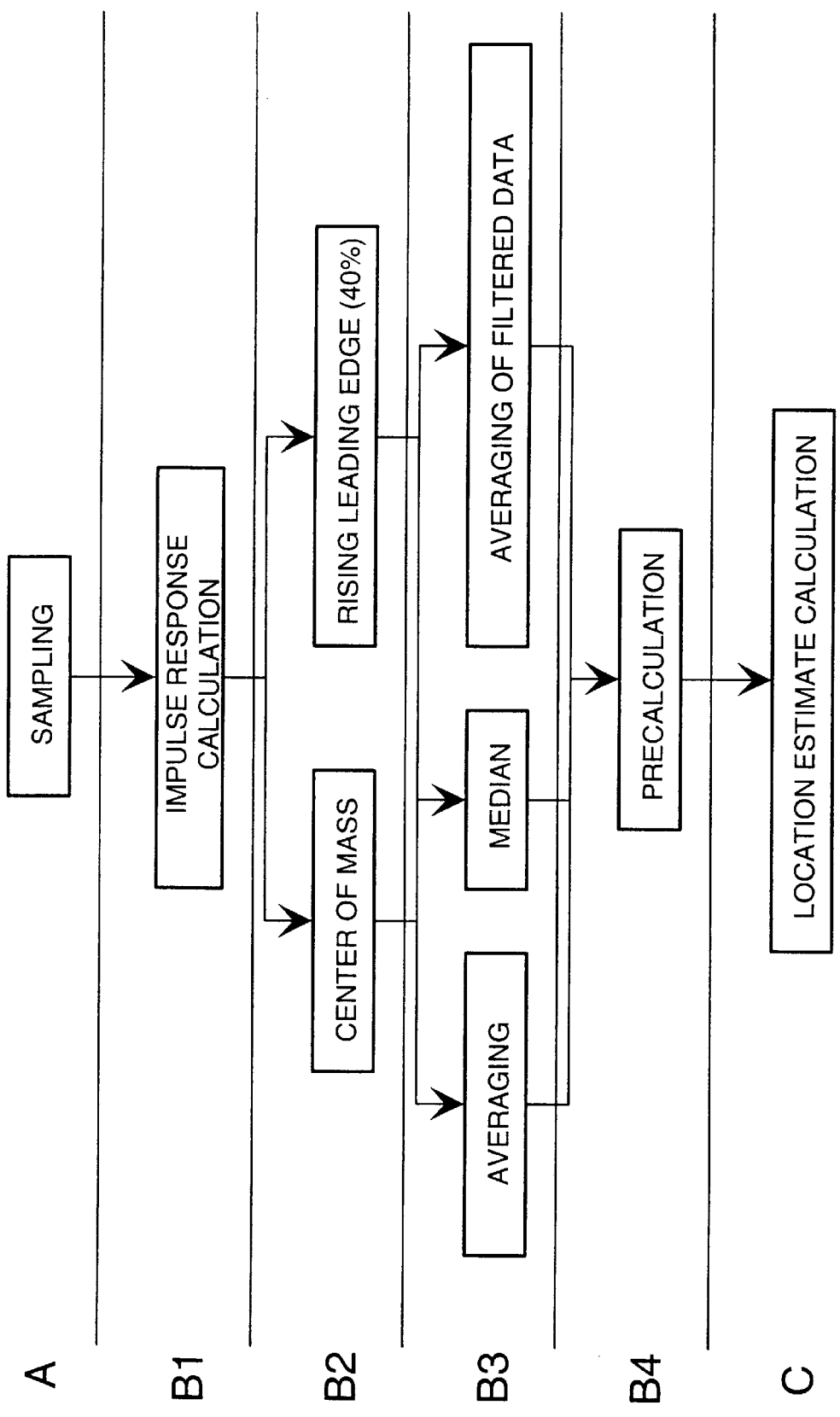

FIG. 5 schematically shows possible boundaries of the distribution of some locating functions presented by way of example. Part A is carried out in the mobile station and includes sampling. Parts B1 to B4 are carried out alternatively in the mobile station or in the mobile network so that the distribution boundary is placed at one of the dashed lines shown. Part B1 includes calculation of impulse response. Part B2 includes the determination of the signal arrival time using a criterion suitable for the shape of the impulse response, such as the center of mass or 40% level of rising edge. Part B3 includes filtering and combining of measurement data, using averaging, calculation of the median or averaging of filtered data. Part B4 includes precalculation, used advantageously for detecting location change. Part C is carried out in the mobile network and includes calculation of location estimate.

FIGS. 6A, 6B and 6C show some exemplary distributions of locating functions.

In FIG. 6A, the mobile station is in idle state in a rural area where no reflections occur in the radio transmission. All operations according to part A are carried out in the mobile station, in this case, sampling, calculation of impulse response, determination of the center of mass and averaging. Operations according to part B are carried out in the mobile network, in this case, precalculation and calculation of location estimate.

In FIG. 6B the mobile station is in idle state in a city where a lot of reflections occur in the radio transmission. All operations according to part A are carried out in the mobile station, in this case, sampling, calculation of impulse response, determination of the advantageously 40%-level of the rising edge and determination of the median. Operations according to part B are carried out in the mobile network, in this case, precalculation and calculation of location estimate.

In FIG. 6C the mobile station is in idle state in a city, monitoring its position and reporting of movement. All operations according to part A are carried out in the mobile station, in this case, sampling, calculation of impulse response, determination of the advantageously 40%-level of the rising edge, determination of the median and precalculation. Operations according to part B are carried out in the mobile network, in this case, calculation of location estimate.

If the distribution of functions is dynamically alterable, it is possible to change between the situations described in FIGS. 6A, 6B and 6C as well as other alternatives e.g. when detecting in the mobile station a change in the impulse width, in the mobile network a change in the signal-to-noise ratio on the basis of data sent from the mobile station, or in the location service center movement by the mobile station from an area to another. At least these are reasons for shifting the execution boundary between the mobile station and mobile network. Averaging and median calculation parameters, such as the magnitude of the set of samples, are also advantageously alterable according to the situation. Natural averaging magnitudes comprise e.g. 5 to 20 samples.

Let us consider a second example, namely, automatic emergency indication which is started using menus or a special key on the mobile station. With menus, one can indicate the type of emergency, say, distress, robbery or heart attack. Based on the activation of the emergency indication, contact is made with an automatic surveillance center which further contacts a location service center 5. The location service center 5 sends to the mobile station 1 a command to carry out locating process as described above, after which the location of the mobile station 1 and the type of the emergency are indicated to an emergency center. Alternatively, locating measures are commenced on the mobile station as soon as the user activates the automatic emergency indication on the mobile station, without waiting for a command from the service center. The emergency center receives the information in the form of voice message or as a message conveyed to a computer. The voice message is preferably stored in the mobile station 1 and indicates the cause of the emergency. The locating and emergency signalling are continued at a predetermined schedule. The location is verified by determining that the mobile station 1 is within the coverage area of the mobile network. Possibly the location is also shown to the user on the display of the apparatus 1.

Emergency indication can also be activated by means of separate activation devices which e.g. monitor the heartbeat of a patient with heart troubles and activate the emergency indication when the pulse becomes weak or disappears, as happens in a heart attack. Other such activation devices include apparatus containing acceleration sensors, which detect collision, and smoke detectors in buildings.

A function may be implemented in the method so that after the activation of the function the mobile station 1 repeatedly requests a secret code in order for not to transmit an alarm. This function is useful especially in a dangerous area where the user might get robbed as the mobile station 1 will call for help, in addition to carrying out the locating process, even if the apparatus were stolen. The function is also useful when the user is unable to call for help, say, because of an attack of illness. Alternatively the function can be realized such that the mobile network waits for regular acknowledgements to prevent an alarm. Then, advantageously, the mobile station 1 automatically informs the mobile network of a low battery charge before the apparatus ceases to function, to not to generate an unnecessary alarm. On the other hand, an alarm is generated if the mobile station 1 gets broken in an accident or, in the case of distress, sinks with the boat.

Different mobile stations 1 may have different computing capacities the use of which changes as the mobile station changes from idle state to active state and vice versa. The mobile station 1 estimates the capacity available, processes measurement results in the limits of the estimated capacity and sends the processed data to a location service center 5 for final processing. Especially processing that requires base station location information is preferably carried out in a location service center 5.

Alternatively, history data are also used in the locating process in such a manner that impossible values are eliminated. Such history data include previous location estimates or in the OTD system, previous OTD values, for example. Impossible values are e.g. those that would result in an unreasonably high speed estimate for the mobile station 1.

The locating process may also utilize subscriber specific profiles which e.g. indicate fixed installation on a car, which may move with high speeds, or data related to the equipment used by the subscriber, say, information about the delays in the propagation of the received signal, generated in the radio-frequency part of the equipment type in question. Coefficients correcting known systematic errors can also be included in the profiles.

Certain elements in the burst signals used in the locating process are known, so they can be used to calculate the impulse response through correlation. Preferably the following elements in the burst signals are used for correlation:

64-bit training sequence of the synchronization channel,
  26-bit training sequence of the common, fast associated, slow associated and stand-alone dedicated control channels as well as that of the traffic channel, and
  32 middle bits of the dummy burst.

Received synchronization bursts are compared with the corresponding long training sequence. As the synchronization bursts are especially suitable for timing measurements, the time difference values calculated from them are used as reference values and possibly weighted in the averaging.

Other bursts are compared with the normal training sequence as that is likely to be the correct one. This is because the number of a training sequence is always the same as the base station color code (BCC) on the broadcast and control channels and usually on other channels as well.

If a received burst does not correlate with any normal training sequence it will be compared with the middle part of the dummy burst. There are eight normal training sequences in GSM.

At least the following prerequisites are used when determining from the shape of the impulse response whether the impulse response is correct: the highest tap of the impulse response is higher than a predetermined threshold value or the highest tap and the taps around it are considerably higher than the rest. When selecting taps high enough, one can use e.g. a 20% threshold for the comparison between the current tap and the highest tap, but the threshold may also be different before and after the highest tap. The latter threshold shall be set higher than the first e.g. in a mountainous area where mountain sides cause reflected non-line-of-sight (NLOS) signals from a base station to the mobile station. The reflected signals are possibly strong, but usually weaker than the signals that arrive via the direct route. A reflected signal is excluded from the locating process because its propagation time is longer than that of a signal arriving via the direct route, and therefore it would cause an erroneous result. When a signal arrives via the direct path only, the impulse response has only one high tap. The signal-to-noise ratio can also be used in determining the threshold value. A window can be formed around the highest tap such that all taps outside the window will be rejected regardless of their height. The window may be e.g. 20 taps long and it confines a safe area on the time axis.

Additionally it is possible to use a boundary checking method in which the highest tap is compared with the first and last taps of the impulse response. The highest tap should be clearly higher than those. The first three and the last three taps could be used in the comparison, for example.

Additionally it is possible to use a statistical method in which the highest tap is expected to be located within a certain time zone which is the only one to be checked. This statistical zone could consist of taps 14 to 25, assuming 33 taps in the impulse response. The highest tap must be located within this zone for the impulse response to be acceptable. The method can be refined by adding tests based on previous bursts.

The global positioning system (GPS) used e.g. on a ship for navigation can possibly be connected to the mobile station 1 so that it would provide more accurate information ation on the position the mobile station 1, especially when far away from base transceiver stations 2, 3, 4 or in the coverage area of only one base transceiver station 2, 3, 4.

The invention is not limited to the application examples described above but it can be modified in many different ways without departing from the scope of the inventional idea defined by the claims set forth below.

What is claimed is:

1. A method for locating a mobile station in a distributed manner using radio signals between the mobile station and mobile network, comprising steps:
    obtaining differences of propagation times of signals propagating between the mobile station and other stations of the mobile network;
    performing a locating process by location computing based on said differences of signal propagation time;
    wherein said location computing includes steps of:
        distributing the computing between a mobile network element and the mobile station by dividing the location computing into operation sequences by forming a first set of operation sequences and a second set of operation sequences separated by an execution boundary therebetween, said execution boundary being dynamically set between any location computing operations; and
        carrying out said first set of operation sequences in a mobile station and carrying out said second set of operation sequences in the mobile network element.

2. The method of claim 1, wherein the first set of operation sequences of locating process are carried out in the mobile station.

3. The method of claim 2, wherein the first set of operation sequences of the locating process ore selected in the mobile station from among a set of operation sequences on the basis of a command from the mobile network.

4. The method of claim 2, wherein the first set of operation sequences carried out in the mobile station are adapted to measurement results by determining parameters.

5. The method of claim 2, wherein data processed in the mobile station by the first set of operation sequences are transferred to a location service center.

6. The method of claim 2, wherein impulse responses are calculated in the mobile station from received location signals and those impulse responses are transferred to a location service center for further processing.

7. The method of claim 2, wherein unprocessed measurement results are transferred from the mobile station to a location service center.

8. The method of claim 2, wherein measurements and precalculation are carried out in the mobile station to decide whether measurement results will be sent from the mobile station to a location service center.

9. The method of claim 2, wherein measurements and precalculation are carried out in the mobile station without carrying out the locating process proper to decide whether functions will be activated in the mobile station.

10. The method of claim 2, wherein measurements and precalculation are carried out in the mobile station, and results of the measurements and the precalculation are compared with reference values to find out, without carrying out the locating process proper, whether the mobile station is located in a certain predetermined area.

11. The method of claim 1, wherein the last operation sequences of locating process are computed in a location service center in the mobile network.

12. The method of claim 1, wherein dummy bursts are used to determine timing.

13. The method of claim 1, wherein locating is started automatically when a call is made to an emergency number.

14. The method of claim 1, wherein the mobile station is located and the location is automatically indicated to an emergency center when an emergency function has been activated.

15. The method of claim 1, wherein the mobile station is capable of transmitting an alarm to the mobile network, and is operative to transmit a recurrent message in the form of a request for a code which inhibits transmission of the alarm, wherein the mobile network waits for the recurrent message from the mobile station and if said message is missing, the alarm is generated.

16. The method of claim 1, wherein the mobile station is capable of transmitting an alarm to the mobile network, and the mobile station decides when alarm conditions have been met.

17. A method for locating a mobile station in a distributed manner using radio signals between the mobile station and mobile network, comprising steps:

obtaining differences of propagation times of signals propagating between the mobile station and other stations of the mobile network;

performing a locating process by location computing based on said differences of signal propagation time:

wherein said location computing includes steps of:

distributing the computing between a mobile network element and the mobile station by dividing the location computing into operation sequences by forming a first set of operation sequences and a second set of operation sequences separated by an execution boundary therebetween, said execution boundary being dynamically set between any location computing operations: and carrying out said first set of operation sequences in a mobile station and carrying out said second set of operation sequences in the mobile network element;

wherein the distribution of locating between the mobile network and the mobile station is dynamically changed by moving an operation sequence execution boundary.

18. The method of claim 17 wherein the moving of the operation sequence execution boundary is accomplished based on a computing capacity of the mobile station.

19. A method for locating a mobile station in a distributed manner using radio signals between the mobile station and mobile network, comprising steps:

obtaining differences of propagation times of signals propagating between the mobile station and other stations of the mobile network;

performing a locating process by location computing based on said differences of signal propagation time;

wherein said location computing includes steps of distributing the computing between a mobile network element and the mobile station by dividing the location computing into operation sequences; and carrying out those operation sequences in the mobile network element and in the mobile station;

wherein, to determine time differences, different burst training sequences are compared by correlation with received signal, and an impulse response obtained as a result of that correlation is used for determining whether the training sequence is correct.

\* \* \* \* \*